United States Patent
Inoue et al.

(10) Patent No.: US 6,872,162 B2
(45) Date of Patent: Mar. 29, 2005

(54) TOROIDAL-TYPE CONTINUOUSLY VARIABLE TRANSMISSION AND CONTINUOUSLY VARIABLE TRANSMISSION APPARATUS

(75) Inventors: Eiji Inoue, Kangawa (JP); Shinji Miyata, Kanagawa (JP)

(73) Assignee: NSK Ltd., Tokyo (JP)

( * ) Notice: Subject to any disclaimer, the term of this patent is extended or adjusted under 35 U.S.C. 154(b) by 60 days.

(21) Appl. No.: 10/644,770

(22) Filed: Aug. 21, 2003

(65) Prior Publication Data

US 2004/0058772 A1 Mar. 25, 2004

(30) Foreign Application Priority Data

Aug. 23, 2002 (JP) .................................. P. 2002-243389

(51) Int. Cl.⁷ ........................ F16H 15/38; F16H 37/02
(52) U.S. Cl. ........................................ 475/216; 476/42
(58) Field of Search .................................. 475/216, 42

(56) References Cited

U.S. PATENT DOCUMENTS

| | | | |
|---|---|---|---|
| 5,033,322 A | | 7/1991 | Nakano |
| 5,569,112 A | | 10/1996 | Fukushima |
| 5,607,372 A | * | 3/1997 | Lohr ........................ 475/216 |
| 5,651,750 A | | 7/1997 | Imanishi et al. |
| 6,471,617 B1 | | 10/2002 | Kuhn et al. |
| 6,517,461 B2 | * | 2/2003 | Shimizu ..................... 475/216 |
| 6,561,941 B2 | * | 5/2003 | Nakano et al. ............. 475/214 |
| 2003/0176255 A1 | * | 9/2003 | Elser et al. .................. 476/42 |

FOREIGN PATENT DOCUMENTS

| | | |
|---|---|---|
| JP | 2-283949 A | 11/1990 |
| JP | 8-4869 A | 1/1996 |
| JP | 8-61453 A | 3/1996 |
| JP | 2000-9196 A | 1/2000 |
| JP | 2001-116097 A | 4/2001 |
| JP | 2001-511506 A | 8/2001 |

* cited by examiner

*Primary Examiner*—Dirk Wright
(74) *Attorney, Agent, or Firm*—Sughrue Mion, PLLC (57) ABSTRACT

A toroidal-type continuously variable transmission has: a casing; a rotary shaft; outside disks; an inside disk; support members; a plurality of support plates; an actuator body; a pair of support posts including support ring portions, the support ring portions respectively existing in middle portions between the inside disk and the outside disks, wherein the respective one-side end portions of the two support posts are connected and fixed to the actuator body in a state that the rotary shaft is inserted through the support ring portions of the two support posts, the axial-direction two end portions of the inside disk are rotatably supported on the support ring portions of the two support posts, and the support plates are supported on the neighboring portions of the respective two end portions of the two support posts.

15 Claims, 8 Drawing Sheets

TOROIDAL-TYPE CONTINUOUSLY VARIABLE TRANSMISSION AND CONTINUOUSLY VARIABLE TRANSMISSION APPARATUS

BACKGROUND OF THE INVENTION

1. Field of the Invention

A toroidal-type continuously variable transmission and a continuously variable transmission apparatus according to the invention are used as an automatic transmission apparatus for a vehicle or a transmission apparatus for adjusting the operating speed of various industrial machines such as a pump.

2. Description of the Related Art

As an example of a transmission which constitutes a transmission for a vehicle, there is known a toroidal-type continuously variable transmission; and, use of such toroidal-type of continuously variable transmission is enforced in part of the vehicle industry. The thus partly enforced toroidal-type continuously variable transmission is a toroidal-type continuously variable transmission of a so called double cavity type in which transmission of power from an input part to an output part is carried out using two systems disposed in parallel to each other. While a toroidal-type continuously variable transmission of this type is conventionally known because it is disclosed in a large number of publications such as U.S. Pat. No. 5,033,322, U.S. Pat. No. 5,569,112 and U.S. Pat. No. 5,651,750, description will be given below of the basic structure of toroidal-type continuously variable transmission of this type with reference to FIG. 7.

Figure 7:
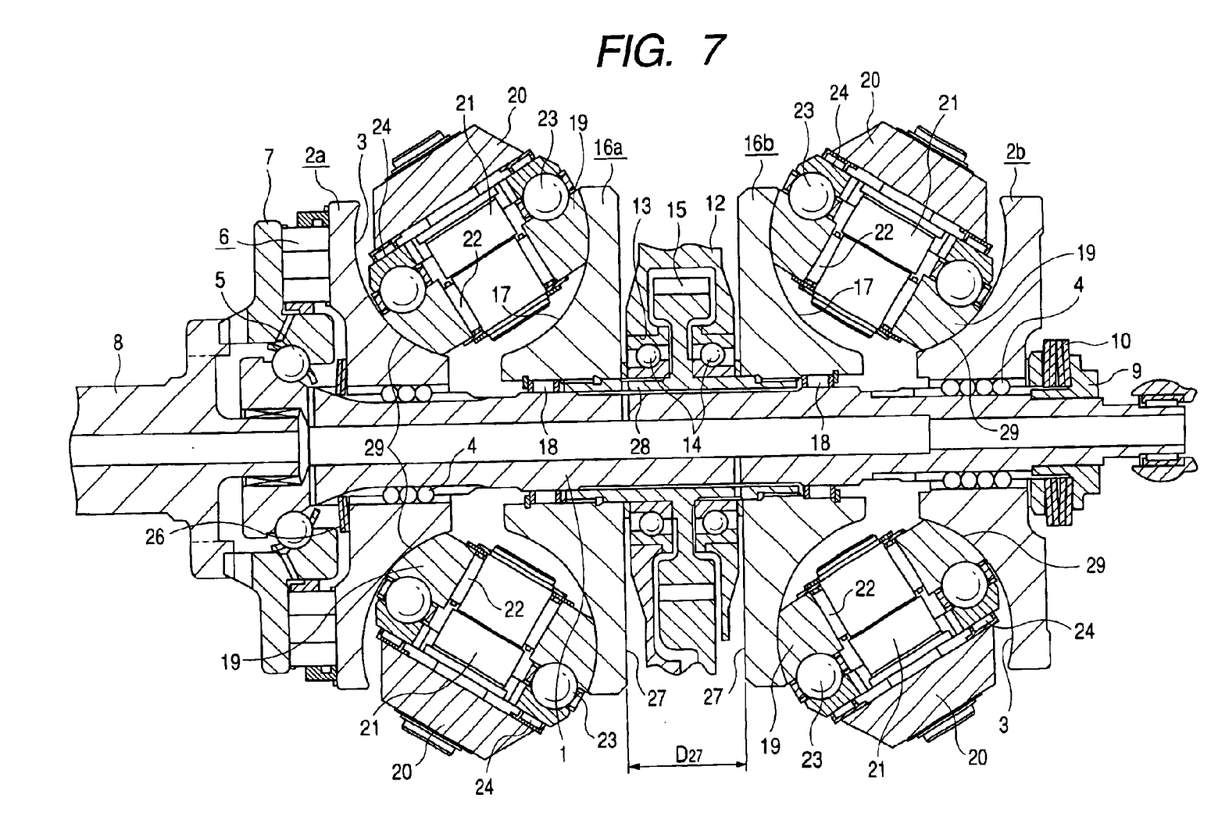

A toroidal-type continuously variable transmission shown in FIG. 7 has an input rotary shaft 1 which corresponds to a rotary shaft. On the peripheries of the near-to-middle-portion-base-end portion (in FIG. 7, the near-to-left-side portion) and the near-to-leading-end portion (in FIG. 7, the near-to-right-side portion) of the input rotary shaft 1, there are supported two input side disks 2a, 2b which correspond to outside disks, respectively. These two input side disks 2a, 2b are respectively supported through their associated ball splines 4, 4 on the input rotary shaft 1 in a state where their input side surfaces 3, 3, which are the axial-direction one-side surfaces of the input side disks and are formed as toroid curved surfaces, are disposed opposed to each other. Therefore, the two input side disks 2a, 2b are supported on the periphery of the input rotary shaft 1 in such a manner that they can be shifted in the axial direction of the input rotary shaft 1 and can be rotated in synchronization with the input rotary shaft 1.

Also, between the base end portion (in FIG. 7, the left end portion) of the input rotary shaft 1 and the outer surface of the input side disk 2a, there are interposed a rolling bearing 5 and a pressing device 6 of a loading cam type. And, a cam plate 7, which constitutes the pressing device 6, is disposed in such a manner that it can be driven and rotated by a drive shaft 8. On the other hand, between the leading end portion (in FIG. 7, the right end portion) of the input rotary shaft 1 and the outer surface of the other input side disk 2b, there are interposed a loading nut 9 and a countersunk plate spring 10 having large elasticity.

The middle portion of the input rotary shaft 1 is inserted through a penetration hole 13 which is formed in a partition wall portion 12 disposed within a casing 11 (see FIGS. 1 to 3, 5 which show the mode for carrying out the invention) in which the toroidal-type continuously variable transmission.

A cylindrical-shaped output cylinder 28 is rotatably supported on the inside diameter side of the penetration hole 13 by a pair of rolling bearings 14, 14, while an output gear 15 is fixed to the outer peripheral surface of the middle portion of the output cylinder 28. Also, on such portions of the two end portions of the output cylinder 28 that respectively project from the two outer surfaces of the partition wall portion 12, there are supported two output side disks 16a, 16b corresponding to inside disks by spline engagement in such a manner that they can be rotated in synchronization with the output cylinder 28

In this state, the output side surfaces 17, 17 of the output side disks 16a, 16b, which are the axial-direction two side surfaces of the output side disks and are respectively formed as toroid curved surfaces, are disposed opposed to the respective input side surfaces 3, 3. Also, between the outer peripheral surface of the middle portion of the input rotary shaft 1 and such portions of the inner peripheral surfaces of the two output side disks 16a, 16 that project beyond the end edge of the output cylinder 28, there are interposed needle roller bearings 18, 18, respectively. While supporting the loads to be applied to the two output side disks 16a, 16b, the output side disks 16a, 16b can be rotated and shifted in the axial direction with respect to the input rotary shaft 1.

Also, on each of such portions of the periphery of the input rotary shaft 1 that are present between the input and output side surfaces 3, 17 (cavities), there are disposed a plurality of (generally, two or three) power rollers 19, 19. These power rollers 19, 19 respectively include peripheral surfaces 29, 29 which are respectively formed as spherically projecting surfaces to be contacted with the input and output side surfaces 3, 17; and, the power rollers 19, 19 are respectively supported on the side surface portions of trunnions 20, 20 serving as support members by displacement shafts 21, 21, radial needle roller bearings 22, 22, thrust ball bearings 23, 23 and thrust needle roller bearings 24, 24 in such a manner that they can be rotated and can be swung and shifted slightly. That is, the displacement shafts 21, 21 are respectively shafts of an eccentric type which are structured such that their respective base half sections and front half sections are eccentric to each other; and, of the two half sections of the displacement shafts 21, 21, the base half sections are respectively supported on the middle portions of the trunnions 20, 20 by another radial needle roller bearings (not shown) in such a manner that they can be swung and shifted.

The power rollers 19, 19 are rotatably supported on the front half sections of the thus-structured displacement shafts 21, 21 by the radial needle roller bearings 22, 22 and thrust ball bearings 23, 23. Also, the shifting movements of the power rollers 19, 19 with respect to the axial direction of the input rotary shaft 1 based on the elastic deformation of the respective composing parts of the toroidal-type continuously variable transmission are allowed due to the-above-mentioned another radial needle roller bearings and thrust needle roller bearings 24, 24.

Further, the trunnions 20, 20 support the pivot shafts 32, 32 (see FIG. 3 which shows the mode for carrying out the invention), which are disposed on the two end portions (in the front and back direction in FIG. 7) of the trunnions 20, 20, on support plates 25a, 25b (see FIGS. 1 to 4 which show the mode for carrying out the invention) which are installed within the casing 11, in such a manner that the pivot shafts 32, 32 can be swung as well as can be shifted in the axial direction. That is, not only the trunnions 20, 20 are supported in such a manner that they can be swung and shifted clockwise and counterclockwise in FIG. 7, but also they can be shifted in the axial direction (in FIGS. 1 to 4, in the upward and downward directions; and, in FIG. 7, in the front and back direction) of the pivot shafts 32, 32 by actuators 31, 31 of an oil pressure type (see FIG. 3 which also shows the mode for carrying out the invention) stored in an actuator body 30 (see FIGS. 1 to 4 which show the mode for carrying out the invention).

When the above-structured toroidal-type continuously variable transmission is in operation, the input side disk 2a can be driven and rotated by the drive shaft 8 through the pressing device 6. Since the pressing device 6 drives and rotates the input side disk 2a while generating an axial-direction thrust force, the pair of input side disks 2a, 2b including the above-mentioned input side disk 2a are respectively pushed toward their associated output side disks 16a, 16b are also rotated in synchronization with each other. As a result of this, the rotational movements of the two input side disks 2a, 2b are respectively transmitted through their associated power rollers 19, 19 to their associated output side disks 16a, 16b, thereby rotating the output gear 15 which is connected to the respective output side disks 16a, 16b through the output cylinder 28.

When the present toroidal-type continuously variable transmission is in operation, the surface pressures of the respective contact portions between the peripheral surfaces 29, 29 of the power rollers 19, 19 and the input and output side surfaces 3, 17 can be secured by the thrust force to be generated by the pressing device 6. Also, these surface pressures increase as the power (torque) to be transmitted from the drive shaft 8 to the output gear 15 increases. Therefore, there can be obtained good transmission efficiency regardless of variations in the torque. Also, even in case where the torque to be transmitted is 0 or quite small, the surface pressures of the contact portions can be secured to a certain degree by the countersunk plate spring 10 and a pre-load spring 26 which is disposed on the inside diameter side of the pressing device 6. Accordingly, the torque transmission in the contact portions can be carried out smoothly without incurring excessive slippage even immediately after start of the operation of the toroidal-type continuously variable transmission.

Figure 3:
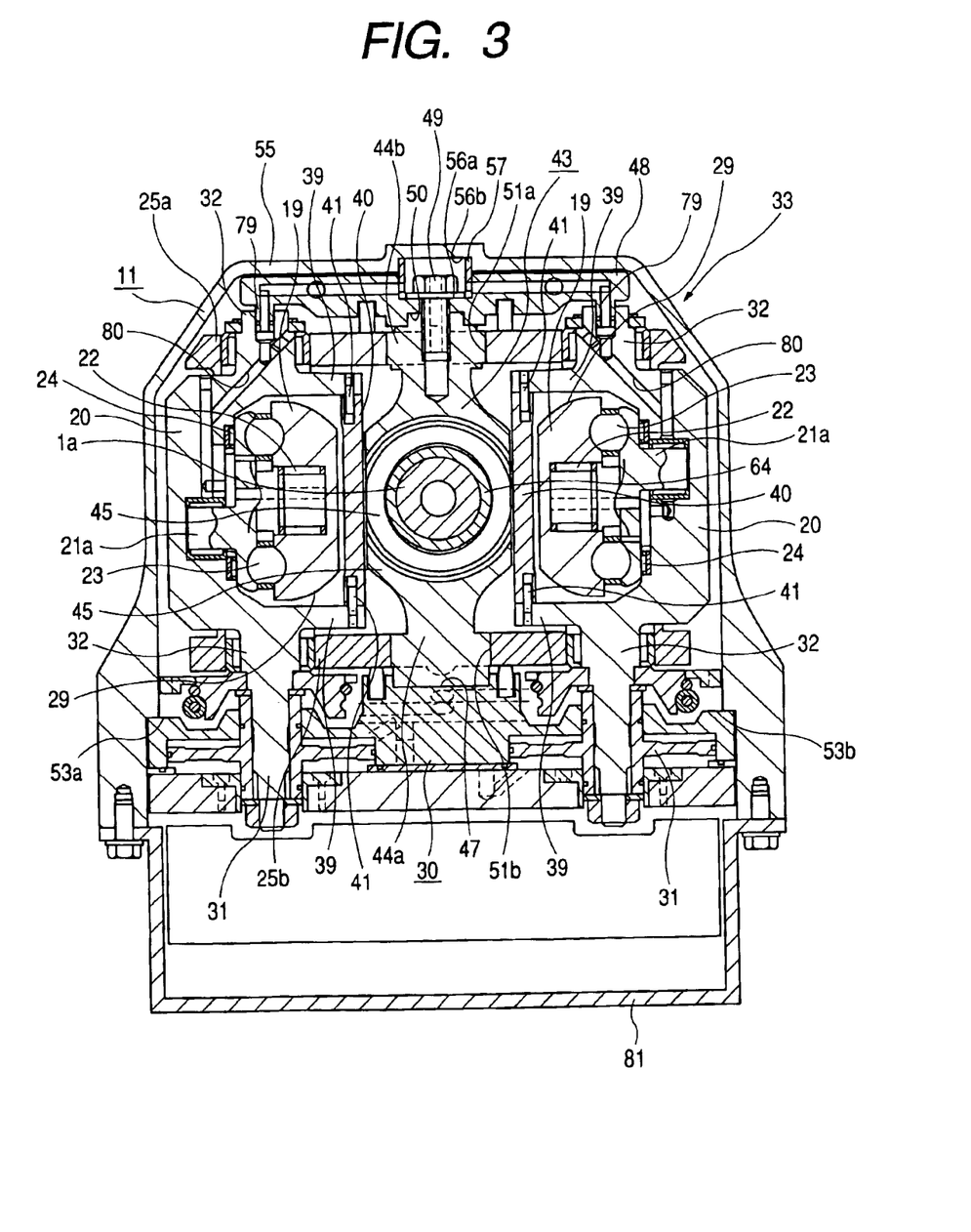
FIG. 3 is a section view taken along the line B—B shown in FIG. 1.

To change the transmission ratio between the drive shaft 8 and output gear 15, the trunnions 20, 20 may be shifted in the front and back direction in FIG. 7 by the actuators 31, 31 (see FIG. 3). In this case, the trunnions 20, 20 in the upper half section in FIG. 7 and the trunnions 20, 20 in the lower half section in FIG. 7 are shifted by the same amount but in the mutually opposite directions. Such shifting motion changes the directions of the forces to be applied in the tangential directions of the contact portions between the peripheral surfaces 29, 29 of the power rollers 19, 19 and the input and output side surfaces 3, 17. And, due to the tangential-direction forces, the trunnions 20, 20 are swung about the pivot shafts 32, 32 that are disposed on the two end portions of their associated trunnions 20.

Such swinging motion of the trunnions 20 changes the positions of the contact portions between the peripheral surfaces 29, 29 of the power rollers 19, 19 and the input and output side surfaces 3, 17 with respect to the diameter directions of the side surfaces 3, 17. The more the contact portions shift outwardly in the diameter direction of the input side surface 3 and inwardly in the diameter direction of the output side surface 17 respectively, the more the transmission ratio changes to the speed increasing side. On the other hand, as shown in FIG. 7, the more the above contact portions changes inwardly in the diameter direction of the input side surface 3 and outwardly in the diameter direction of the output side surface 17 respectively, the more the transmission ratio changes to the speed reducing side.

In the case of the conventional structure shown in FIG. 7, the output cylinder 28 is rotatably supported on the partition wall portion 12, the pair of output side disks 16a, 16b are respectively disposed on the two sides of the partition wall portion 12, and the power rollers 19, 19 are also respectively disposed on the two sides of the partition wall portion 12. This arrangement makes it troublesome to assemble the support plates 25a, 25b and trunnions 20, 20 and the like into the casing 11. That is, to assemble the toroidal-type continuously variable transmission into the casing 11, after the support plate 25a situated on the deep side (in FIGS. 1 and 2, on the upper side) of the casing 11 is assembled to the casing 11 and the output cylinder 28 is assembled to the partition wall portion 12, with the pair of output side disks 16a, 16b assembled to the output cylinder 28, the input rotary shaft 1 must be inserted and further the four trunnions 20, 20, the support plate 25b on the actuator body 30 side (in FIGS. 1 and 2, on the lower side), the actuator body 30 and the pair of input side disks 2a, 2b must be assembled sequentially in this order.

The above assembling operation of the respective composing parts of the conventional structure must be carried out in a limited (small) space which is present within the casing 11 and thus the assembling operation is troublesome. Also, in case where a poor operation is found in any one of the composing parts due to the errors of the dimensions of the parts and poor assembled conditions after they are assembled, it is also troublesome to cope with such poor operation. That is, in order to allow the toroidal-type continuously variable transmission to fulfill its expected performance, the position relationships between the composing parts must be restricted very strictly and, after assembled, it is necessary to make measurements as to whether the position relationships between the respective composing parts are accurate or not as well as whether the respective composing parts operate accurately or not. In case where this measuring operation finds any poor operation in the composing parts, the composing parts assembled must be dismantled and, as the need arises, the composing parts must be assembled again by changing the parts to be assembled (for example, by changing a shim for dimension adjustment). These dismantling and re-assembling operations must be respectively carried out in a limited space within the casing 11, which is troublesome. Especially, in the case of a continuously variable transmission apparatus in which a toroidal-type continuously variable transmission and a planetary gear mechanism are combined together in order to increase the transmission ratio and enhance the durability and transmission efficiency, the number of parts to be assembled is large, which causes the above-mentioned problems to arise more often.

Further, in the case of the conventional structure shown in FIG. 7, since, between the outer surfaces 27, 27 of the pair of output side disks 16a, 16b, there are interposed not only the output gear 15 but also the pair of rolling bearings 14, 14 and the partition wall portion 12 for supporting these rolling bearings 14, 14, the distance $D_{27}$ between the two outer surfaces 27, 27 is large. This large distance increases the axial-direction dimension of the toroidal-type continuously variable transmission, so that the toroidal-type continuously variable transmission increases in size and weight. Such increases in the size and weight of the toroidal-type continuously variable transmission are caused not only by the increase in the distance $D_{27}$ but also by increases in the axial-direction thicknesses of the respective output side disks 16a, 16b. The reason for this as follows.

That is, in the speed reducing state of the toroidal-type continuously variable transmission shown in FIG. 7, the peripheral surfaces 29, 29 of the power rollers 19, 19 press against the output side surfaces 17, 17 of the output side disks 16a, 16a in a state where these peripheral surfaces 29, 29 are contacted with the near-to-outside-diameter portions of these output side surfaces 17, 17. As a result of this, large moments, the centers of which are the spline engaged portions thereof with the output cylinder 28, are applied to the output side disks 16a, 16a. In order to restrict a deviation in the transmission ratio and secure the durability of the output side disks 16a, 16b regardless of such large moments, the elastic deformation of these output side disks 16a, 16b must be restricted. And, to restrict such elastic deformation, it is necessary to increase the axial-direction thickness dimensions of the output side disks 16a, 16b to thereby enhance the rigidity of the output side disks 16a, 16b. However, in case where the axial-direction thickness dimensions of the output side disks 16a, 16b are increased for this reason, as described above, the toroidal-type continuously variable transmission increases in size.

On the other hand, in JP-2001-116097, there is disclosed a structure in which an output side disk of an integral type is rotatably supported on the periphery of the middle portion of an input side rotary shaft by a pair of radial needle roller bearings and a pair of thrust needle roller bearings. According to this structure, not only the partition wall portion 12 can be omitted from the conventional structure shown in FIG. 7 but also dimension of the output side disk in a axial direction thereof can be shortened, therefore a toroidal-type continuously variable transmission can be reduced in size and weight as a whole. However, in the case of the structure disclosed in the above-cited publication JP-2001-116097, no consideration is given to the facilitation of an assembling operation.

SUMMARY OF THE INVENTION

The present invention aims at eliminating the drawbacks found in the above-mentioned conventional toroidal-type continuously variable transmission and continuously variable transmission apparatus. Accordingly, it is an object of the invention to provide a toroidal-type continuously variable transmission and a continuously variable transmission apparatus which not only can be reduced in size and weight but also can be assembled easily.

In attaining the above object, according to one aspect of the invention, there is provided a toroidal-type continuously variable transmission, having: a casing; a rotary shaft rotatably supported in the interior of the casing; a pair of outside disks each including an axial-direction one-side surface having an arc-shaped section, the outside disks being respectively supported on the two end portions of the rotary shaft so as to be rotatable in synchronization with the rotary shaft in a state that axial-direction one-side surfaces opposed to each other; an inside disk including axial-direction two side surfaces each having an arc-shaped section, the inside disk being supported so as to be rotatable with respect to the rotary shaft in a state that the axial-direction two side surfaces respectively opposed to the axial-direction one-side surfaces of the two outside disks; support members interposed by two or more between the axial-direction two side surfaces of the inside disk and the axial-direction one-side surfaces of the two outside disks with respect to the axial direction of the toroidal-type continuously variable transmission so as to be swung and shifted about associated pivot shafts disposed at positions twisted with respect to the rotary shaft; a plurality of support plates for supporting the pivot shafts disposed on the two end portions of the support members; a plurality of power rollers each including a peripheral surface formed as a spherically projecting surface and respectively rotatably supported on the associated support plates, the peripheral surfaces of the power rollers being contacted with the axial-direction two side surfaces of the inside disk and the axial-direction one-side surfaces of the respective outside disks; an actuator of an oil pressure type for shifting the support members in the axial direction of associated pivot shafts; an actuator body storing the main body portion of the actuator therein; a pair of support posts including support ring portions, the support ring portions respectively existing in middle portions between the axial-direction two side surfaces of the inside disk and the axial-direction one-side surfaces of the two outside disks, wherein the respective one-side end portions of the two support posts are connected and fixed to the actuator body in a state that the rotary shaft is inserted through the support ring portions of the two support posts, the axial-direction two end portions of the inside disk are rotatably supported on the support ring portions of the two support posts, and the support plates are supported on the neighboring portions of the respective two end portions of the two support posts.

According to the above construction, the present invention further includes a hollow rotary shaft disposed on the periphery of the middle portion of the rotary shaft so as to be rotatable with respect to the rotary shaft, wherein the inside disk is an integrally-formed output side disk, the base end portion of the hollow rotary shaft is connected to the output side disk so as to transmit the rotation power of the output side disk, the middle portion of the hollow rotary shaft is inserted through the inside diameter side of one of the two outside disks and the leading end portion of the hollow rotary shaft is projected from the axial-direction other end face of the present outside disk, thereby to take out the rotation power of the output side disk.

According to the above construction, wherein the inside disk is an integrally-formed output side disk, an output gear is disposed on the outer peripheral edge of the output side disk, and the rotation power of the output side disk is taken out by the output gear.

According to the above construction, wherein the rotary shaft, the pair of outside disks, the inside disk, the plurality of support members, the plurality of support plates, the plurality of power rollers, the plurality of actuators, and the pair of support posts are assembled to the actuator body before being stored into the casing.

According to the above construction, wherein, in the portion of the casing that is situated on the lower side when the casing is carried on a vehicle, there is formed the opening; and, an actuator body including the rotary shaft, the pair of outside disks, the inside disk, the plurality of support members, the plurality of support plates, the plurality of power rollers, the plurality of actuators, and the pair of support posts is stored into the casing through the opening, and the actuator body is connected and fixed to the casing.

According to the above construction, the present invention is a half-toroidal-type continuously variable transmission in which lines connecting the center axes of the pivot shafts serving as the inclination centers of the power rollers to the rolling contact positions between the peripheral surfaces of the power rollers and the axial-direction side surfaces of the outside and inside disks are free from presenting on the same straight line.

According to the above construction, wherein the support members and the power rollers are interposed between the axial-direction one-side surfaces of the pair of outside disks and the axial-direction two-side side surfaces of the inside disk by two at two positions on the opposite side in the diameter direction of the respective disks Another aspect of the invention is a continuously variable transmission apparatus, in combination a toroidal-type continuously variable transmission unit with a planetary-gear-type transmission unit, having: an input shaft connected to the rotary shaft of the toroidal-type continuously variable transmission unit; and an output shaft connected to the composing parts of the planetary-gear-type transmission unit, wherein the toroidal-type continuously variable transmission unit, has: a casing; a rotary shaft rotatably supported in the interior of the casing; a pair of outside disks each including an axial-direction one-side surface having an arc-shaped section, the outside disks being respectively supported on the two end portions of the rotary shaft so as to be rotatable in synchronization with the rotary shaft in a state that axial-direction one-side surfaces opposed to each other; an inside disk formed as an integral body or including a pair of elements connected together and including axial-direction two side surfaces each having an arc-shaped section, the inside disk being supported so as to be rotatable with respect to the rotary shaft in a state that the axial-direction two side surfaces respectively opposed to the axial-direction one-side surfaces of the respective outside disks; support members interposed by two or more between the axial-direction two side surfaces of the inside disk and the axial-direction one-side surfaces of the respective outside disks with respect to the axial direction of the toroidal-type continuously variable transmission so as to be swung and shifted about associated pivot shafts thereof disposed at positions twisted with respect to the rotary shaft; a plurality of support plates for supporting the pivot shafts disposed on the two end portions of the support members; a plurality of power rollers each including a peripheral surface formed as a spherically projecting surface and respectively rotatably supported on the associated support plates, the peripheral surfaces of the power rollers being contacted with the axial-direction two side surfaces of the inside disk and the axial-direction one-side surfaces of the two outside disks; an actuator of an oil pressure type for shifting the support members in the axial direction of the associated pivot shafts; an actuator body storing the main body portion of the actuator therein; a pair of support posts each including a support ring portion, the support ring portions respectively existing in the middle portion between the axial-direction two side surfaces of the inside disk and the axial-direction one-side surfaces of the two outside disks, wherein the respective one-side end portions of the two support posts are connected and fixed to the actuator body in a state that the rotary shaft is inserted through the support ring portions of the two support posts, the axial-direction two end portions of the inside disk are rotatably supported on the support ring portions of the two support posts, and the support plates are supported on the neighboring portions of the two end portions of the two support posts, the planetary-gear-type transmission unit is structured such that the power is transmitted thereto from the rotary shaft and the inside disk of the toroidal-type continuously variable transmission unit, the planetary-gear-type transmission unit includes a switching device for switching the transmission passage of the power into two systems.

According to the above construction, the present invention further including: a hollow rotary shaft disposed on the periphery of the middle portion of the rotary shaft, and wherein the planetary-gear-type transmission unit further has: a carrier connected and fixed to the pair of outside disks including the toroidal-type continuously variable transmission unit concentrically with the two outside disks and rotating with the both of outside disks; a plurality of first planetary gears rotatably supported on one of the axial-direction two side surfaces of the carrier opposed to one of the outside disks; a first sun gear connected to the inside disk by the hollow rotary shaft not only disposed concentrically with the inside and outside disks so as to be rotatable but also meshingly engaged with the first planetary gears; a plurality of second planetary gears rotatably supported on the other side surface of the carrier; a second sun gear not only disposed concentrically with the inside and outside disks so as to be rotatable but also meshingly engaged with the second planetary gears; and, a ring gear not only disposed concentrically with the input side and output side disks so as to be rotatable but also meshingly engaged with the first planetary gears, wherein the switching device selects a mode for transmitting the power taken out from the inside disk through the ring gear to the output shaft or a mode for transmitting the power taken out from the inside disk through the second sun gear to the output shaft.

As described above, in the case of a toroidal-type continuously variable transmission and a continuously variable transmission apparatus according to the invention, not only the inside disks but also the plurality of support members and power rollers can be supported at their respective given positions by the pair of support posts with their respective one-end portions connected and fixed to the actuator body. Therefore, the main portions of the toroidal-type continuously variable transmission can be assembled outside the casing before the toroidal-type continuously variable transmission is assembled into the casing. Accordingly, the assembling operation can be executed in a wide space, thereby being able to facilitate the assembling operation. Also, after assembly of the main portions of the toroidal-type continuously variable transmission, before the toroidal-type continuously variable transmission is stored into the casing, the operating states of the present main portions can be confirmed. And, in case where the operating state are found poor, dismantling and re-assembly of the main portions can be carried out easily in a wide space outside the casing. Also, it is easy to repair the main portions when a trouble occurs.

Also, in the case of a toroidal-type continuously variable transmission and a continuously variable transmission apparatus according to the invention, since the inside disks are rotatably supported by the pair of support posts, differently from the previously-described conventional structure, there is eliminated the need to interpose the rolling bearings and the partition wall portion for supporting the rolling bearings between the pair of inside disks. Therefore, the distance between the two inside disks can be shortened and the two inside disks can be formed as an integral body, which makes it possible to reduce the toroidal-type continuously variable transmission in size and weight.

DETAILED DESCRIPTION OF THE PREFERRED EMBODIMENTS

Figure 1:
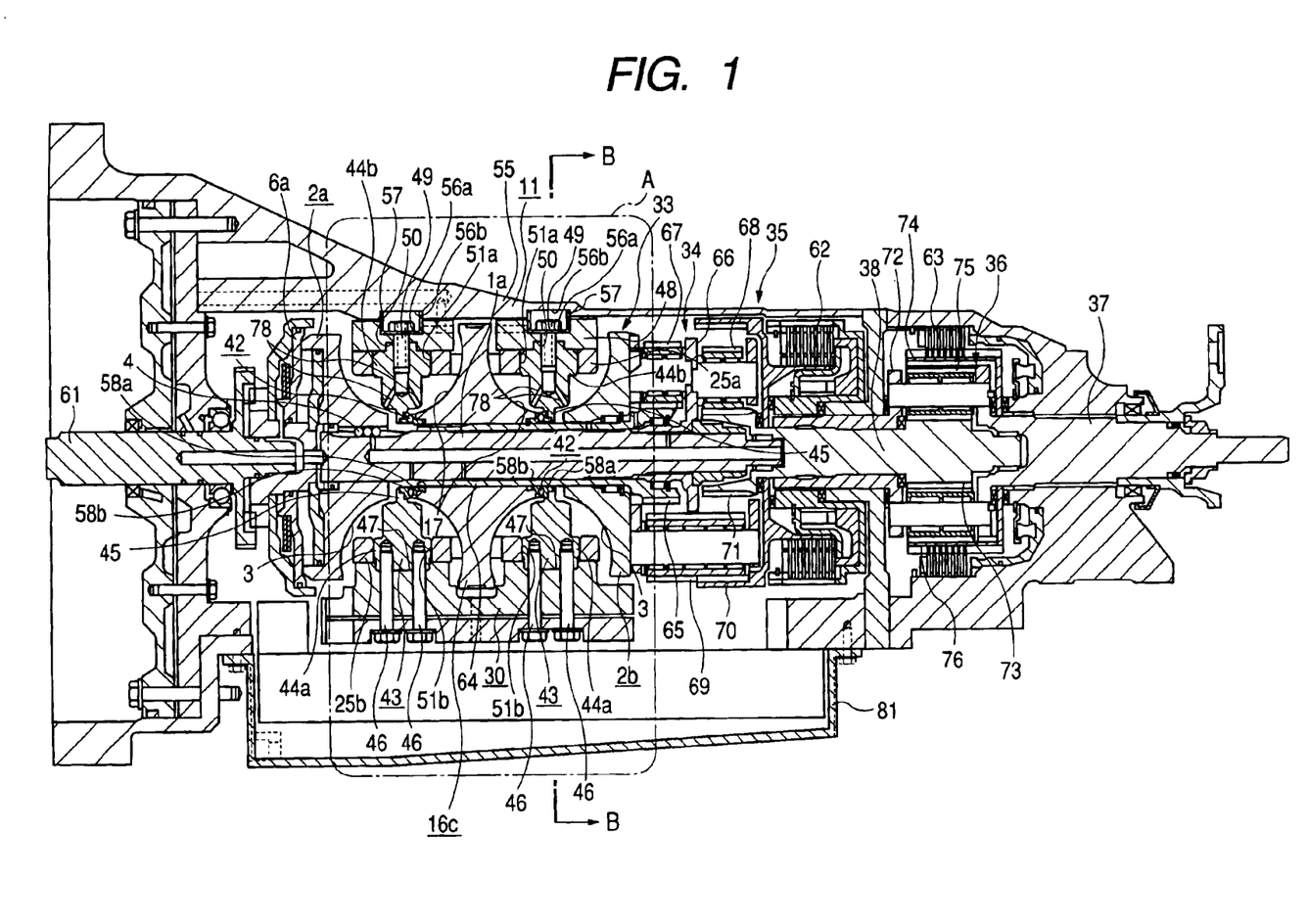
FIG. 1 is a section view of an embodiment of the mode for carrying out the invention.
Figure 2A:
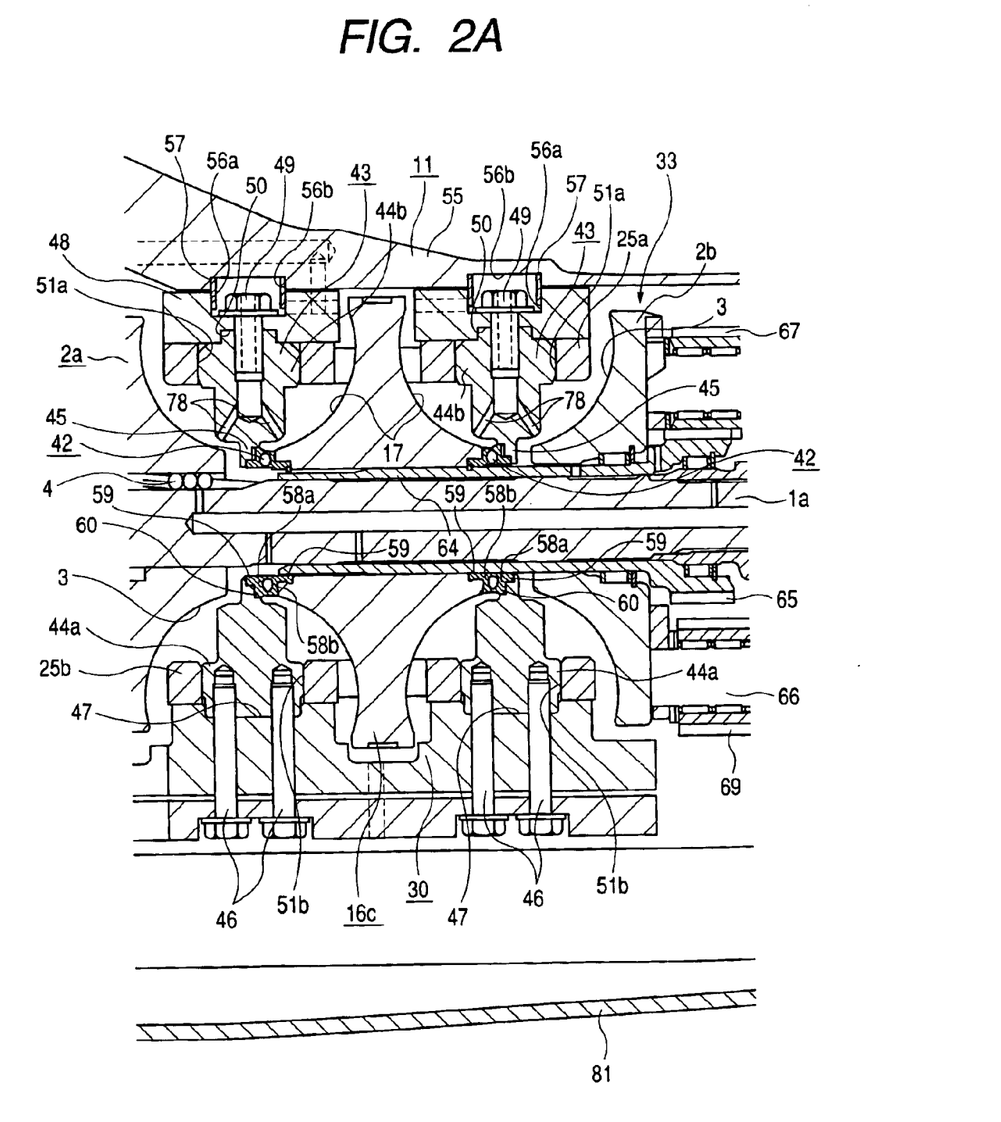
FIG. 2A is an enlarged view of the A portion shown in FIG. 1.
Figure 2B:
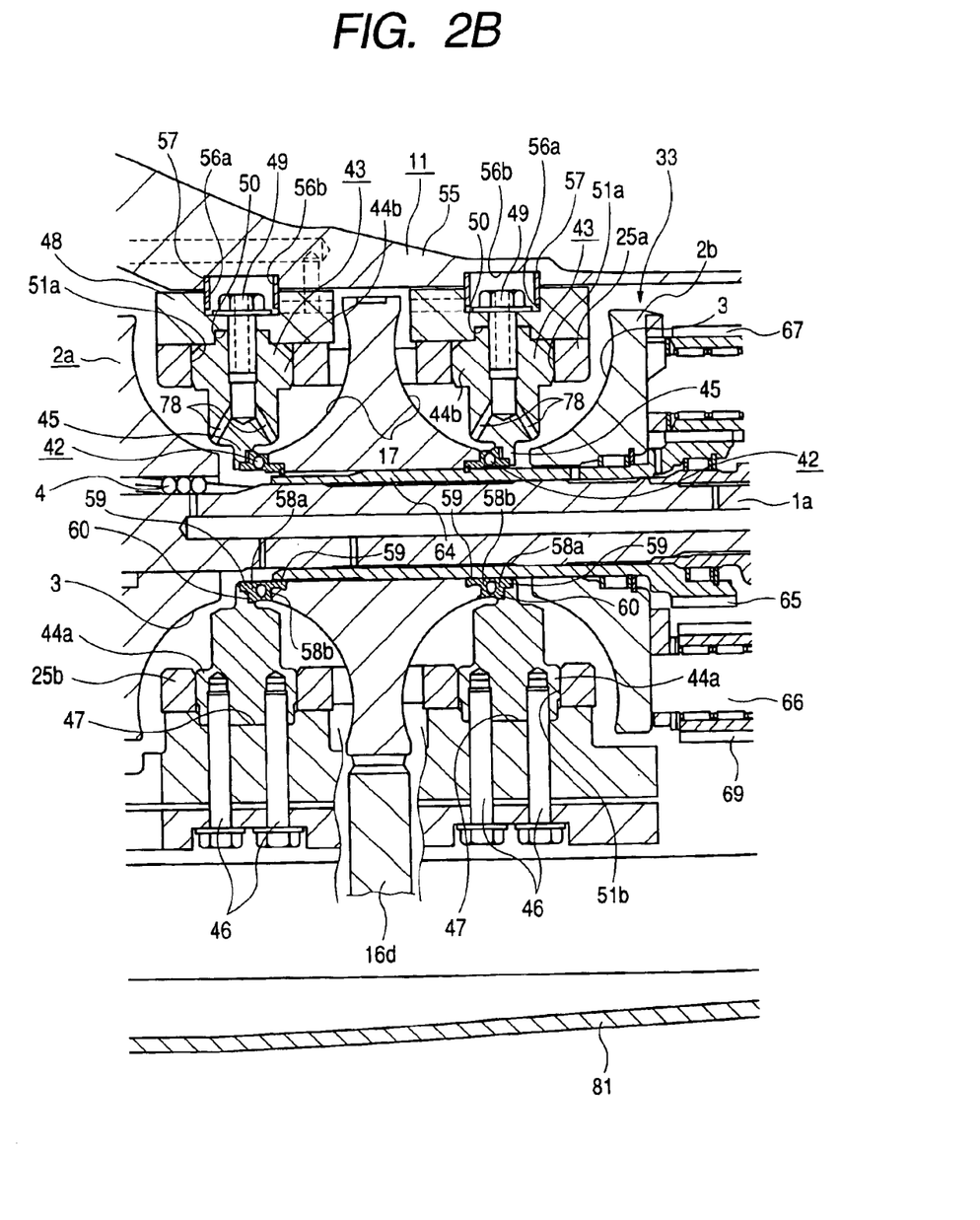
FIG. 2B is an enlarged view of the A portion shown in FIG. 1 which shows an embodiment outputting the power from the output side disk.

Now, FIGS. 1 to 5 show an embodiment of the mode for carrying out the invention. By the way, FIGS. 1 to 3 show the dimensional relationship of the embodiment such as the aspect ratio thereof using the actual dimensional relationship thereof. Also, in FIGS. 4 and 5 which are respectively perspective views of the embodiment as well, this dimensional relationship is drawn substantially in accordance with the actual dimensional relationship. A continuously variable transmission apparatus according to the present embodiment is composed of a combination of a toroidal-type continuously variable transmission unit 33 corresponding to a toroidal-type continuously variable transmission and first to third planetary-gear-type transmission units 34 to 36, and further includes an input rotary shaft 1$a$ corresponding to a rotary shaft and an output shaft 37. In the illustrated embodiment, between the input rotary shaft 1$a$ and output shaft 37, there is interposed a transmission shaft 38 in such a manner that it is concentric with the two shafts 1$a$, 37 and can be rotated with respect to the two shafts 1$a$, 37. And, the first and second planetary-gear-type transmission units 34, 35 are disposed in such a manner that they are set over and between the input rotary shaft 1$a$ and transmission shaft 38, while the third planetary-gear-type transmission unit 36 is disposed in such a manner that it is set over and between the transmission shaft 38 and output shaft 37.

Of the above transmission units, the toroidal-type continuously variable transmission unit 33 includes a pair of input side disks 2$a$, 2$b$ respectively serving as outside disks, an integrally-formed output side disk 16$c$, and a plurality of power rollers 19, 19. And, the pair of input side disks 2$a$, 2$b$ are connected to each other through the input rotary shaft 1$a$ in such a manner that they are concentric with each other and can be rotated in synchronization with each other. Also, the output side disk 16$c$ is supported between the two input side disks 2$a$, 2$b$ in such a manner that it is concentric with the two input side disks 2$a$, 2$b$ and can be rotated with respect to the two input side disks 2$a$, 2$b$. Further, in the case of the power rollers 19, 19, two or more power rollers 19 are held respectively by and between the axial-direction two side surfaces of the output side disk 16$c$ and the axial-direction one-side surfaces of the two input side disks 2$a$, 2$b$. And, the power rollers 19, 19 are rotated as the two input side disks 2$a$, 2$b$ are rotated and, while rotating, the power rollers 19 transmit the power from the two input side disks 2$a$, 2$b$ to the output side disk 16$c$.

FIG. 2B shows an embodiment outputting the power from the output side disk 16$c$. An output gear 16$d$ is disposed on the outer peripheral edge of the output side disk 16$c$, and the rotation power of the output side disk 16$c$ is taken out by the output gear 16$d$.

Also, in the present embodiment, as shown in FIG. 3, a pair of bent wall portions 39, 39 are disposed on the length-direction two end portions of trunnions 20, 20 which support the power rollers 19, 19; and, the leading end portions of the pair of bent wall portions 39, 39 are connected to each other by connecting members 40, 40. The connecting members 40 are respectively disposed so as to step over their associated power rollers 19 and, at the same time, in a state where the two end faces of the connecting members 40 are butted against the mutually opposing inner surfaces of the bent wall portions 39, 39 of the trunnion 20, 20, the connecting members 40 are respectively connected and fixed to their associated trunnions 20, 20 by screws 41, 41. In the case of the present embodiment in which the-thus structured connecting members 40, 40 are used, the bending rigidity of the respective trunnions 20, 20 can be enhanced, which makes it difficult for the trunnions 20, 20 to be elastically deformed. This can prevent displacement shafts 21$a$ from being inclined due to the deformed trunnions 20, 20 and thus can restrict the deviation of the positions of the power rollers 19, 19 supported on the front half sections of the displacement shafts 21$a$, thereby being able to stabilize the transmission operation of the continuously variable transmission apparatus. By the way, in the case of the present embodiment, each of the displacement shafts 21$a$ and an outer race constituting a thrust ball bearing 23 supporting the power roller 19 in a rotatable manner are formed as an integral body.

Further, in the case of the present embodiment, the axial-direction two end portions of the output side disk 16$c$ are respectively rotatably supported by rolling bearings such as a pair of thrust angular ball bearings 42, 42. In connection with this, in the case of the present embodiment, in order to support a pair of support plates 25$a$, 25$b$ which are used to support the two end portions of the trunnions 20, 20, there are disposed a pair of support posts 43, 43 in the interior of a casing 11 through an actuator body 30. The support posts 43, 43 are formed in such a manner that a pair of support post portions 44$a$, 44$b$, which are respectively disposed on the diameter-direction opposite sides with the input rotary shaft 1$a$ between them so as to be concentric with each other, are connected together by a circular-ring-shaped support ring portion 45. The input rotary shaft 1$a$ penetrates through the inside portion of the support ring portion 45.

Also, the lower end portions of the respective support posts 43, 43 are respectively connected and fixed to the upper surface of the actuator body 30 by a plurality of bolts 46, 46 in such a manner that the mounting positions and mounting directions thereof are restricted. For this connection and fixation, in the upper surface of the actuator body 30, there are formed recessed portions 47, 47 which allow the lower end portions of the support posts 43, 43 to be inserted into the inner surfaces of the recessed portions 47, 47 with no play between them. Also, in the lower end portions of the support posts 43, 43, there are formed a plurality of screw holes which are opened in the lower end faces of these lower end portions. In a state where the lower end portions of the support posts 43, 43 are fitted with the inner surfaces of the recessed portions 47, 47, the support posts 43, 43 are inserted through the actuator body 30 from bottom and are threadedly engaged with the screw holes; and further, the support posts 43, 43 are fixed at given positions in the upper surface of the actuator body 30 using the tightly fastened bolts 46, 46.

On the other hand, the upper end portions of the support posts 43, 43 are respectively connected and fixed to the lower surface of a connecting plate 48 by their associated bolts 49, 49 in such a manner that the mounting positions of the support posts 43 are restricted. For this connection and fixation, in the lower surface of the connecting plate 48, there are formed recessed portions 50, 50 which allow the upper end portions of the support posts 43, 43 to be fitted with the inner surfaces of the recessed portions 50, 50 with no play between them. Also, in each of the upper end portions of the respective support posts 43, 43, there is formed a screw hole which is opened in the central portion of the upper end surface thereof. And, in a state where the upper end portions of the support posts 43, 43 are fitted with the inner surfaces of the recessed portions posts 43, 43, these support posts 43, 43 are inserted through the connecting plate 48 from above and are threadedly engaged into their associated screw holes; and further, the support posts 43 are fixed at their respective given positions in the lower surface of the connecting plate 48 by their associated bolts 49, 49 which are tightly fastened.

The above-mentioned pair of support posts 43, 43, as described above, are respectively connected and fixed to between the upper surface of the actuator body 30 and the lower surface of the connecting plate 48 in such a manner that the support posts 43 extend over and between the actuator body 30 upper surface and connecting plate 48 lower surface with the positions thereof restricted. In this state, of the support post portions 44a, 44b which are disposed in the vicinity of the two end portions of the support posts 43, 43, the lower-side support post portions 44a, 44a are present at positions just above the upper surface of the actuator body 30. And, support holes 51b, 51b, which are formed in the lower-side support plate 25b of the above-mentioned pair of support plates 25a, 25b, are fitted with the outer surfaces of the support post portions 44a, 44a of the two support posts 43, 43 with no play between them. Also, the upper-side support post portions 44b, 44b are present at positions just below the lower surface of the connecting plate 48. And, in the upper-side support plate 25a of the pair of support plates 25a, 25b, there are formed support holes 51a, 51a; and, the support holes 25a, 25b are formed are fitted with the outer surfaces of the support post portions 44b, 44b of the two support posts 43, 43 with no play between them.

By the way, in the illustrated embodiment, in the lower-side support plate 25b, there are disposed projecting portions 52a, 52b, 52c (FIG. 4) which function as stoppers for restricting the inclination angles of the trunnions 20, 20. That is, the three projecting portions 52a, 52b, 52c are respectively formed at three positions in the back-and-forth-direction (in FIGS. 1 and 2, in the right and left direction; and, in FIG. 3, in the front and back direction) two end portions and central portion of the width-direction (in FIGS. 1 and 2, in the front and back direction of; and, in FIG. 3, in the right and left direction) two side edge portions of the support plate 25b. These three projecting portions 52a, 52b, 52c are used to prevent the trunnions 20, 20 from being inclined excessively about the pivot shafts 32, 32 that are disposed on the two end portions of their associated trunnions 20, 20. And, the projecting portions 52a, 52b, 52c prevent the peripheral surfaces 29, 29 of the power rollers 19, 19 supported on the trunnions 20, 20 from shifting outwardly in the diameter direction of the input side disks 2a, 2b and output side disk 16c from the input and output side surfaces 3, 17 of these disks 2a, 2b, 16c.

Also, of the actuator body 30 and connecting plate 48 which are connected to each other by the pair of support posts 43, 43, the actuator body 30 is fixed to the lower portion of the casing 11. To realize this fixation, in the near-to-opening portion of the lower end of the inner surface of the casing 11, there are disposed stage portions 53a, 53b; and, in the near-to-two-end portions of the actuator body 30 in the width direction thereof (in FIGS. 1 and 2, in the front and back direction; and, in FIG. 3, in the right and left direction), there are formed bolt insertion holes 54, 54 (FIG. 4)). When fixing the actuator body 30 to the interior of the casing 11, the near-to-width-direction-two-end portions of the upper surface of the actuator body 30 are butted against the stage portions 53a, 53b respectively. And, bolts (not shown), which are inserted through the bolt insertion holes 54, 54 from bottom, are threadedly engaged with screw holes opened up in their respective stage portions 53a, 53b and are further tightly fastened.

On the other hand, the connecting plate 48 is mounted in the interior of the casing 11 in such a manner that the positions thereof in the length direction (in FIGS. 1 and, in the right and left direction; and, in FIG. 3, in the front and back direction) and in the width direction thereof are restricted. To enforce this position restriction, in the mutually opposing portions of the upper surface of the connecting plate 48 and the lower surface of the top plate portion 55 of the casing 11, there are formed positioning recessed portions 56a, 56b respectively. These positioning recessed portion 56a, 56b respectively have a circular-shaped plane shape. In a state where the actuator body 30 is fixed to the interior of the casing 11, there are set cylindrical-shaped positioning sleeves 57, 57 over and between the positioning recessed portions 56a, 56a formed in the upper surface of the connecting plate 48 and the positioning recessed portions 56b, 56b formed in the lower surface of the top plate portion 55. Due to this structure, the respective upper and lower end portions of the pair of support posts 43, 43 are supported on and fixed to the casing 11 in such a manner that they are positioned.

The output side disk 16c is rotatably supported by the support ring portions 45, 45 which not only are disposed in the middle portions of the pair of support posts 43, 43 fixed to their respective given-positions in the interior of the casing 11 in the above-mentioned manner but also are respectively present in the central portions of the cavities (spaces) existing between the respective side surfaces of the input side disks 2a, 2b and output side disk 16c. To realize this, the respective thrust angular ball bearings 42, 42 are interposed between the support ring portions 45, 45 and the axial-direction two end faces of the output side disk 16c, that is, an inside diameter side portion more interior than the output side surfaces 17, 17 that are disposed on the axial-direction two side surfaces of the output side disk 16c In the case of the illustrated embodiment, on the near-to-inside-diameter portions of the outer surfaces (the mutually opposite-side side surfaces) of a pair of races 58a, 58b constituting the thrust angular ball bearings 42, 42, there are disposed short-cylindrical-shaped projecting-strip portions 59, 59 (FIG. 2A) over the entire peripheries of the present near-to-inside-diameter portions.

And, the projecting-strip portions 59, 59 are fitted with the inner surfaces of the end portions of the support ring portions 45, 45 and output side disk 16c with no play between them, thereby setting the positions of the thrust angular ball bearings 42, 42 with respect to the diameter direction thereof. Also, shim plates 60, 60 (FIG. 2A) are interposed respectively between the outer surfaces of the races 58a, 58a and the support ring portions 45, 45, thereby setting the positions of the thrust angular ball bearings 42, 42 with respect to the axial direction thereof. Also, in this state, a desired pre-load is applied to these thrust angular ball bearings 42, 42. Therefore, the output side disk 16c is rotatably supported between the support posts 43, 43, which are disposed one pair in each of the cavities, in such a manner that it is positioned not only in the diameter direction thereof but also in the axial direction thereof.

Also, in the case of the illustrated continuously variable transmission apparatus, the base end portion (in FIG. 1, the left end portion) of the input rotary shaft 1a is connected through a drive shaft 61 to a crankshaft (not shown) of an engine (not shown), so that the input rotary shaft 1a can be driven and rotated by the crankshaft. Also, as a pressing device 6a which is used to apply proper surface pressures to the rolling contact portions (traction portions) of the axial-direction one-side surfaces of the two input side disks 2a, 2b and the axial-direction two side surfaces of the output side disk 16c with respect to the peripheral surfaces of the power rollers 19, 19, there is used a pressing device of an oil pressure type. Also, using an oil pressure source (not shown) such as a gear pump, pressure oil can be supplied not only to the pressing device 6a and actuators 31, 31 each of an oil pressure type used to shift the trunnions 20, 20 for gear change but also to an oil pressure cylinder used to connect and disconnect a low speed clutch 62 and a high speed clutch 63 (both of which will be discussed later).

Also, the base end portion (in FIGS. 1 and 2, the left end portion) of a hollow rotary shaft 64 is spline engaged with the output side disk 16c. And, the hollow rotary shaft 64 is inserted into the distant-from-engine side (in FIGS. 1 and 2, the right side) of the inner side of the input side disk 2b, so that the rotation power of the output side disk 16c can be taken out. Further, to the portion of the leading end portion (in FIGS. 1 and 2, the right end portion) of the hollow rotary shaft 64 that projects from the outer surface of the input side disk 2b, there is fixed a first sun gear 65 which is used to constitute the first planetary-gear-type transmission unit 34.

On the other hand, between the input side disk 2b and the portion of the leading end portion (in FIGS. 1 and 2, the right end portion) of the input rotary shaft 1a that projects from the hollow rotary shaft 64, there is interposed a first carrier 66 so as to extend between and over them, so that the input side disk 2b and input rotary shaft 1a can be rotated in synchronization with each other. And, at several circumferential-direction equidistant positions (generally, at three or four positions) of the axial-direction two side surfaces of the first carrier 66, there are rotatably supported planetary gears 67~69 which are used to constitute the first and second planetary-gear-type transmission units 34, 35 each of a double pinion type. Further, on the periphery of one half section (in FIGS. 1 and 2, the right half section) of the first carrier 66, there is rotatably supported a first ring gear 70.

Of the planetary gears 67~69, the planetary gear 67, which is situated near to the toroidal-type continuously variable transmission unit 33 (in FIGS. 1 and 2, situated near to the left side) and is disposed inside with respect to the diameter direction of the first carrier 66, is meshingly engaged with the first sun gear 65. Also, the planetary gear 68, which is situated on the distant side (in FIGS. 1 and 2, on the right side) from the toroidal-type continuously variable transmission unit 33 and is disposed inside with respect to the diameter direction of the first carrier 66, is meshingly engaged with a second sun gear 71 which is fixed to the base end portion (in FIG. 1, the left end portion) of the transmission shaft 38. Further, the remaining planetary gears 69, which are respectively disposed outside with respect to the diameter direction of the first carrier 66, are set larger in the axial-direction dimension than the two planetary gears 67, 68 which are disposed inside; and, the planetary gears 69 are meshingly engaged with the two planetary gears 67, 68. In addition, the remaining planetary gears 69 are meshingly engaged with the first ring gear 70. By the way, it is also possible to employ a structure that, instead of the two outside disposed (with respect to the diameter direction of the carrier 66) planetary gears being used independently of each other, a wide ring gear is meshingly engaged with these two planetary gears.

On the other hand, a second carrier 72 for constituting the third planetary-gear-type transmission unit 36 is connected and fixed to the base end portion (in FIG. 1, the left end portion) of the output shaft 37. And, the second carrier 72 is connected to the first ring gear 70 through the low speed clutch 62. Also, a third sun gear 73 is fixedly secured to the near-to-front-end portion (in FIGS. 1 and 2, the near-to-right-end portion) of the transmission shaft 38. Further, on the periphery of the third sun gear 73, there is disposed a second ring gear 74; and, the high speed clutch 63 is interposed between the second ring gear 74 and a fixed portion such as the casing 11. In addition, two or more sets of planetary gears 75, 76, which are respectively interposed between the second ring gear 74 and third sun gear 73, are rotatably supported on the second carrier 72. These planetary gears 75, 76 are meshingly engaged with each other; and, the planetary gears 75, which are disposed inside with respect to the diameter direction of the second carrier 72, are meshingly engaged with the third sun gear 73, while the planetary gears 76 disposed outside with respect to the diameter direction of the second carrier 72 are meshingly engaged with the second ring gear 74.

In the case of the above-structured continuously variable transmission apparatus according to the present embodiment, the power, which has been transmitted from the input rotary shaft 1a through the pair of input side disks 2a, 2b and respective power rollers 19, 19 to the integrally-formed output side disk 16c, is taken out through the hollow rotary shaft 64. In a state where the low speed clutch 62 is connected and the connection of the high speed clutch 63 is cut off, in case where the transmission ratio of the toroidal-type continuously variable transmission unit 33 is changed, while maintaining constant the rotation speed of the input rotary shaft 1a, the rotation speed of the output shaft 37 can be switched from a forward rotation condition to a reverse rotation condition or vice versa with a stopping condition between them. That is, in this state, a differential component between the first carrier 66 rotating in the forward direction together with the input rotary shaft 1a and the first sun gear 65 rotating in the opposite direction together with the hollow rotary shaft 64 is transmitted from the first ring gear 70 through the low speed clutch 62 and second carrier 72 to the output shaft 37. In this state, by setting the transmission ratio of the toroidal-type continuously variable transmission unit 33 at a given value, the output shaft 37 can be stopped; and, besides, by changing the transmission ratio of the toroidal-type continuously variable transmission unit 33 from the above-mentioned given value to the speed increasing side, the output shaft 37 can be rotated in the direction to back the vehicle. On the other hand, in case where the transmission ratio of the toroidal-type continuously variable transmission unit 33 is changed from the above given value to the speed reducing side, the output shaft 37 can be rotated in the direction to advance the vehicle.

Further, in a state where the connection of the low speed clutch 62 is cut off and the high speed clutch 63 is connected, the output shaft 37 is rotated in the direction to advance the vehicle. That is, in this state, the rotation power of the planetary gear 67 of the first planetary-gear-type transmission unit 34 rotatable in accordance with the differential component between the first carrier 66 rotating in the forward direction together with the input rotary shaft 1a and the first sun gear 65 rotating in the opposite direction together with the hollow rotary shaft 64 is transmitted through the planetary gear 69 to the planetary gear 68 of the second planetary-gear-type transmission unit 35, thereby rotating the transmission shaft 38 through the second sun gear 71. And, due to the mutually meshingly engagement between the third sun gear 73 disposed on the leading end portion of the transmission shaft 38 and the second ring gear 74 and planetary gears 75, 76 respectively cooperating with the third sun gear 73 in constituting the third planetary-gear-type transmission unit 36, the second carrier 72 and the output shaft 37 connected to the second carrier 72 are rotated in the direction to advance the vehicle. In this state, more shift the transmission ratio of the toroidal-type continuously variable transmission unit 33 into the speed increasing side, the more be fast the rotation speed of the output shaft 37.

Figure 6:
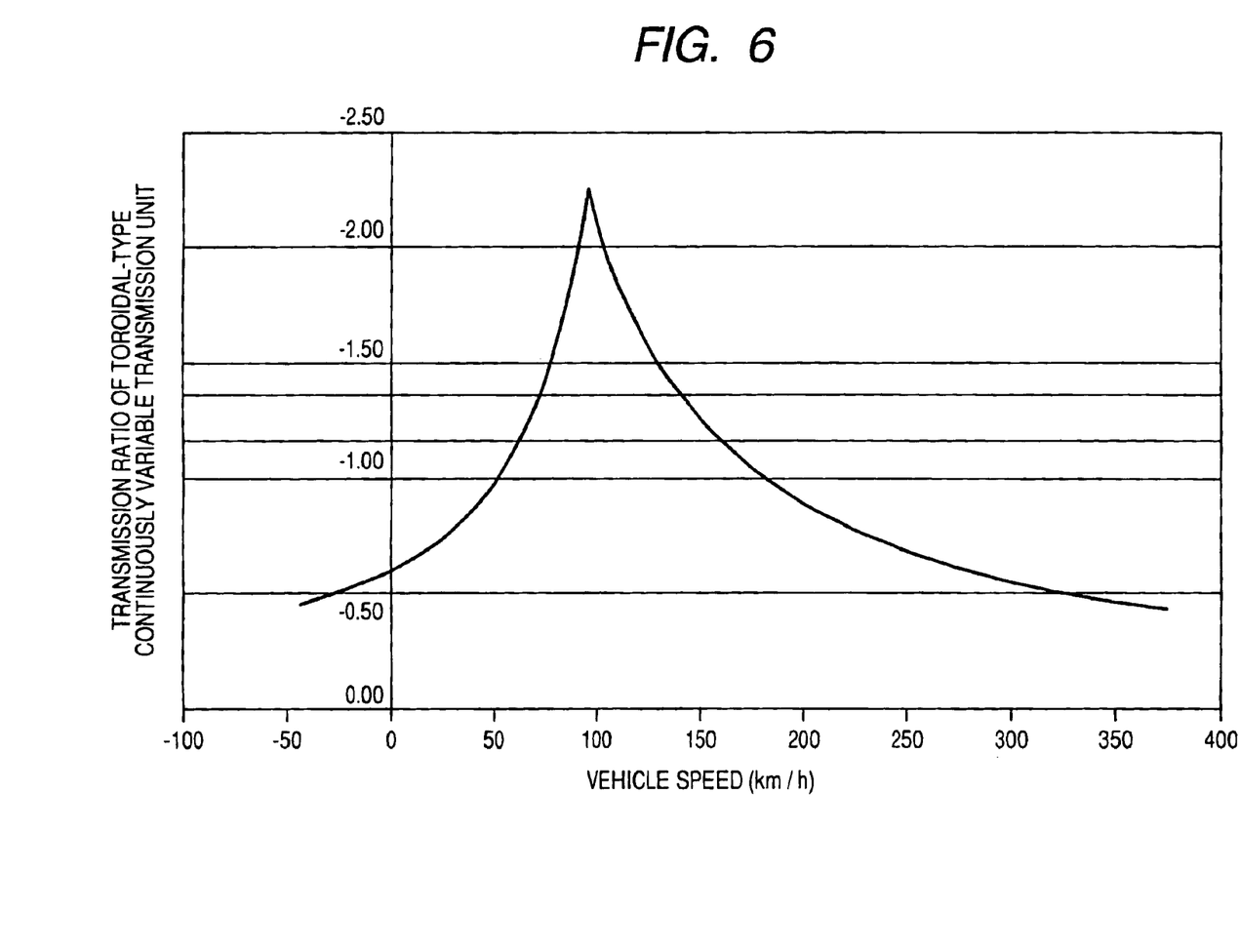
FIG. 6 is a graphical representation of the relationship between the transmission ratio of a toroidal-type continuously variable transmission and the transmission ratio of the whole of a continuously variable transmission apparatus in a state where the rotation speed of an engine is kept constant; and, FIG. 7 is a section view of an example of the basic structure of a conventionally known toroidal-type continuously variable transmission.

Now, FIG. 6 shows an example of the relationship between the transmission ratio (the speed reduction ratio) of the toroidal-type continuously variable transmission unit 33 and the speed ratio of the whole of the continuously variable transmission apparatus. The vertical axis of FIG. 6 represents the transmission ratio of the toroidal-type continuously variable transmission unit 33, while the horizontal axis of FIG. 6 stands for theoretical vehicle speeds (km/h) when the input rotary shaft 1a is rotated at a constant speed (5600 min$^{-1}$) by an engine of about 3L displacement. As can be seen clearly from FIG. 6, by setting the transmission ratio of the toroidal-type continuously variable transmission unit 33 at a value of about 0.6 in a state where the low speed clutch 62 is connected and the high speed clutch 63 is disconnected, while leaving the input rotary shaft 1a in rotation, the output shaft 37 can be stopped. Also, by changing the transmission ratio of the toroidal-type continuously variable transmission unit 33 with the value of about 0.6 as the boundary value, the vehicle can be advanced or backed. Further, in case where the boundary value of the transmission ratio of the toroidal-type continuously variable transmission unit 33 is in the range of about 2.2~2.3, by changing the transmission ratio of the toroidal-type continuously variable transmission unit 33 to the speed increasing side in a state where the low speed clutch 62 is disconnected and the high speed clutch 63 is connected, the speed of the vehicle can be increased.

Figure 4:
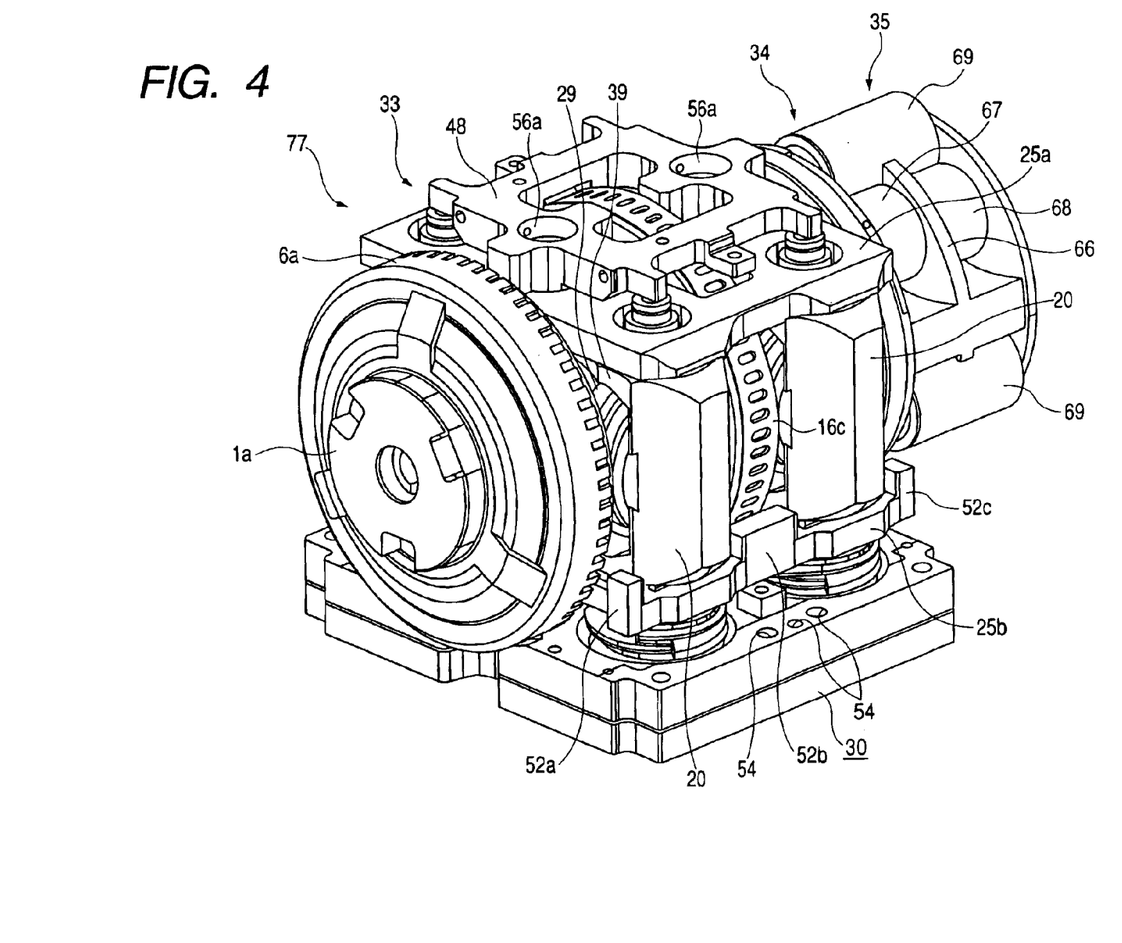
FIG. 4 is a perspective view of a module serving as the main portions of a continuously variable transmission apparatus, showing a state before it is stored into a casing.
Figure 5:
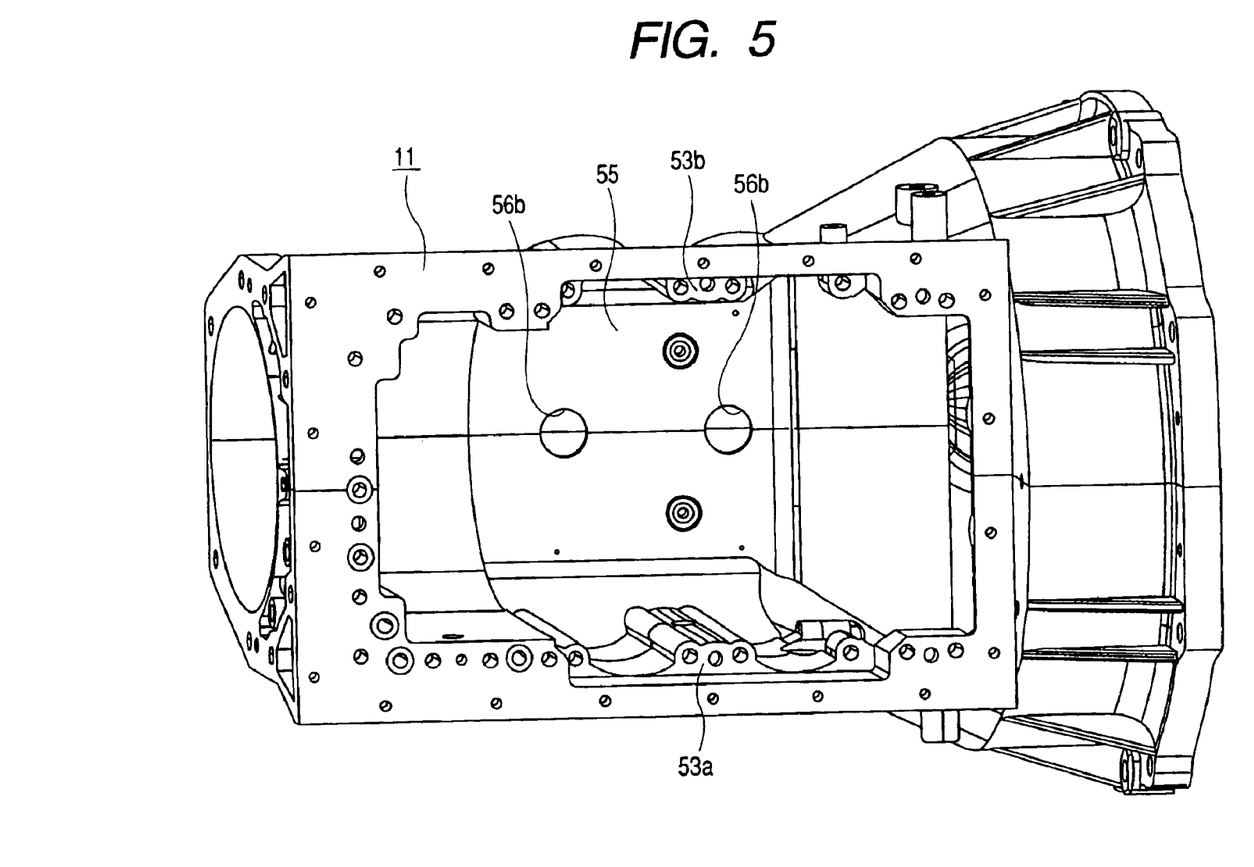
FIG. 5 is a perspective view of a casing, showing a state in which the casing is viewed from bottom.

To assemble the continuously variable transmission apparatus structured and operatable in the above-mentioned manner, the toroidal-type continuously variable transmission unit 33 as well as the first and second planetary-gear-type transmission units 34, 35, as shown in FIG. 4, are previously assembled outside the casing 11 before they are stored into the casing 11. That is, using the pair of support posts 43, 43 (see FIGS. 1~3) having their respective lower ends connected and fixed to the actuator body 30, the output side disk 16c and hollow rotary shaft 64 can be rotatably supported. Also, using the pair of upper and lower support plates 25a, 25b fitted with and supported on the outer surfaces of the support post portions 44a, 44b which are disposed on the two upper and lower end portions of the two support posts 43, 43, the plurality of trunnions 20, 20 and power rollers 19, 19 can be supported at their respective given positions. Further, the pressing device 6a, the pair of input side disks 2a, 2b, the first and second planetary-gear-type transmission unit 34, 35 and the like are assembled to the input rotary shaft 1a which is inserted through the hollow rotary shaft 64.

Therefore, the main portions of the toroidal-type continuously variable transmission unit 33 as well as the first and second planetary-gear-type transmission units 34, 35 respectively constituting the continuously variable transmission apparatus are assembled together outside the casing 11 before they are stored into the casing 11, thereby being able to produce a module 77 which is shown in FIG. 4 and provides the main portions of the continuously variable transmission apparatus. The assembling operation of the module 77 can be executed in a wide space with no interference with the casing 11; that is, the assembling operation can be facilitated. Also, after assembly of the module 77, before the module 11 is stored into the casing 11, the operation condition of the module 77 can be confirmed. And, in case where the operation condition of the module 77 is found poor, the module 77 can be taken into original composing parts and the-thus-dismantled parts can be assembled again easily in a wide space outside the casing 11.

On the other hand, in case where the operation condition of the-module 77 is found proper, the module 77 is inserted into the casing 11 from the lower end opening of the casing 11 with the connecting plate 48 facing upwardly. And, the cylindrical-shaped positioning sleeves 57, 57 are set over and between the positioning recessed portions 56a, 56a formed in the upper surface of the connecting plate 48 and the positioning recessed portions 56b, 56b formed in the lower surface of the top plate portion 55, near-to-two-end portions of the upper surface of the actuator body 30 are respectively butted against the stage portions 53a, 53b. The bolts (not shown) inserted through the bolt insertion holes 54, 54 of the actuator body 30 from bottom are threadedly engaged with the screw holes formed in the stage portions 53a, 53b and are further tightly fastened, thereby fixing the module 77 to the interior of the casing 11 After completion of the fixing operation, the lower end opening of the casing 11 is closed by an oil pan 81.

By the way, the composing parts not included in the module 77 such as the third planetary-gear-type transmission unit 36 are assembled to the interior of the casing 11 after the module 77 is assembled to the interior of the casing 11. Also, in the illustrated embodiment, on the upper portions of the support posts 43, 43, there are disposed oil supply nozzles 78, 78 which are used to supply lubricating oil (traction oil) to the traction portions. Into these oil supply nozzles 78, 78, there can be supplied the lubricating oil from oil supply passages respectively formed in the top plate portion 55 and connecting plate 48 through the positioning recessed portions 56a, 56a and the center holes of the bolts 49, 49. Also, in the interior portions of the trunnions 20, 20, there are formed oil supply passages 80, 80 which are used to feed lubricating oil to the rolling bearing portions associated with the power rollers 19, 19, so that lubricating oil can be fed from the oil supply passage formed in the top plate portion 55 into the oil supply passages 80, 80 formed in the trunnions 20, 20. In correspondence to this, on the lower surface of the connecting plate 48, there are disposed oil supply plugs 79, 79 which are used to feed the lubricating oil to the oil supply passages 80, 80; and thus, as the module 77 is stored into the casing 11, the oil supply passage on the connecting plate 48 side and the oil supply passages on the trunnions 20, 20 side are allowed to communicate with each other. Also, according to the present embodiment, in the outer peripheral edge of the output side disk 16c and in the outer peripheral edge of the pressing device, there are formed the diameter-direction uneven portions at regular intervals in the circumferential direction thereof, thereby being able to detect the rotation speeds of the output side disk 16c and input side disks 2a, 2b.

In the case of the toroidal-type continuously variable transmission unit 33 constituting the module 77 which is stored into the casing 11 in the above-mentioned manner, differently from the conventional structure shown in the previously-described FIG. 7, there is eliminated the need to interpose the rolling bearings 14, 14 and the partition wall portion 12 (see FIG. 7) for supporting the rolling bearings 14, 14 between the pair of output side disks 16a, 16b. And, it is possible to use the integrally-formed output side disk 16c, which makes it possible to reduce the axial-direction dimension of the installation portion of the output side disk 16c. Thus, the toroidal-type continuously variable transmission unit 33 can be reduced in size and weight by an amount corresponding to the reduction in the axial-direction dimension.

Further, according to the present embodiment, since the output side disk 16c is formed as an integral structure in which the axial-direction two side surfaces thereof are used as the output side surfaces 17, 17, the forces to be applied to the output side surfaces 17, 17 when the toroidal-type continuously variable transmission unit 33 is in operation can be mutually cancelled within the output side disk 16c. As a result of this, the output side disk 16c can be restricted in the elastic deformation regardless of the moment loads that are applied from the power rollers 19, 19. This makes it possible to reduce the axial-direction thickness dimension of the output side disk 16c and, therefore, the toroidal-type continuously variable transmission can be reduced in size and weight in this respect as well.

By the way, the output gear may also be integrally disposed on the outer peripheral edge of the integrally-formed output side disk. In case where such structure is employed, a transmission shaft for taking out the power from the output side disk may be disposed in parallel to the input rotary shaft. And, another gear fixedly disposed on the end portion of the transmission shaft may be meshingly engaged with the output gear.

Since the invention is structured and operates in the above-mentioned manner, the assembling operation thereof can be facilitated and, therefore, not only the cost of a toroidal-type continuously variable transmission can be reduced but also the repairing operation thereof can be facilitated.

Also, because the axial-direction dimension of the toroidal-type continuously variable transmission can be reduced, while securing the necessary performance thereof, the size and weight thereof can be reduced, which makes it possible for the present toroidal-type continuously variable transmission to be assembled to a vehicle body of a smaller size. That is, the invention can contribute toward practical use of the toroidal-type continuously variable transmission.

What is claimed is:

1. A toroidal-type continuously variable transmission, comprising:
    a casing;
    a rotary shaft rotatably supported in the interior of the casing;
    a pair of outside disks each including an axial-direction one-side surface having an arc-shaped section, the outside disks being respectively supported on the two end portions of the rotary shaft so as to be rotatable in synchronization with the rotary shaft in a state that axial-direction one-side surfaces opposed to each other;
    an inside disk including axial-direction two side surfaces each having an arc-shaped section, the inside disk being supported so as to be rotatable with respect to the rotary shaft in a state that the axial-direction two side surfaces respectively opposed to the axial-direction one-side surfaces of the two outside disks;
    support members interposed by two or more between the axial-direction two side surfaces of the inside disk and the axial-direction one-side surfaces of the two outside disks with respect to the axial direction of the toroidal-type continuously variable transmission so as to be swung and shifted about associated pivot shafts disposed at positions twisted with respect to the rotary shaft;
    a plurality of support plates for supporting the pivot shafts disposed on the two end portions of the support members;
    a plurality of power rollers each including a peripheral surface formed as a spherically projecting surface and respectively rotatably supported on the associated support plates, the peripheral surfaces of the power rollers being contacted with the axial-direction two side surfaces of the inside disk and the axial-direction one-side surfaces of the respective outside disks;
    an actuator of an oil pressure type for shifting the support members in the axial direction of associated pivot shafts;
    an actuator body storing the main body portion of the actuator therein;
    a pair of support posts including support ring portions, the support ring portions respectively existing in middle portions between the axial-direction two side surfaces of the inside disk and the axial-direction one-side surfaces of the two outside disks,
    wherein the respective one-side end portions of the two support posts are connected and fixed to the actuator body in a state that the rotary shaft is inserted through the support ring portions of the two support posts, the axial-direction two end portions of the inside disk are rotatably supported on the support ring portions of the two support posts, and the support plates are supported on the neighboring portions of the respective two end portions of the two support posts.

2. A toroidal-type continuously variable transmission as set forth in claim 1, further including a hollow rotary shaft disposed on the periphery of the middle portion of the rotary shaft so as to be rotatable with respect to the rotary shaft,
    wherein the inside disk is an integrally-formed output side disk, the base end portion of the hollow rotary shaft is connected to the output side disk so as to transmit the rotation power of the output side disk, the middle portion of the hollow rotary shaft is inserted through the inside diameter side of one of the two outside disks and the leading end portion of the hollow rotary shaft is projected from the axial-direction other end face of the present outside disk, thereby to take out the rotation power of the output side disk.

3. A toroidal-type continuously variable transmission as set forth in claim 1, wherein the inside disk is an integrally-formed output side disk, an output gear is disposed on the outer peripheral edge of the output side disk, and the rotation power of the output side disk is taken out by the output gear.

4. A toroidal-type continuously variable transmission as set forth in claim 1, wherein the rotary shaft, the pair of outside disks, the inside disk, the plurality of support members, the plurality of support plates, the plurality of power rollers, the plurality of actuators, and the pair of support posts are assembled to the actuator body before being stored into the casing.

5. A toroidal-type continuously variable transmission as set forth in claim 2, wherein the rotary shaft, the pair of outside disks, the inside disk, the plurality of support members, the plurality of support plates, the plurality of power rollers, the plurality of actuators, and the pair of support posts are assembled to the actuator body before being stored into the casing.

6. A toroidal-type continuously variable transmission as set forth in claim 3, wherein the rotary shaft, the pair of outside disks, the inside disk, the plurality of support members, the plurality of support plates, the plurality of power rollers, the plurality of actuators, and the pair of support posts are assembled to the actuator body before being stored into the casing.

7. A toroidal-type continuously variable transmission as set forth in claim 4, wherein, in the portion of the casing that is situated on the lower side when the casing is carried on a vehicle, there is formed an opening; and, an actuator body including a rotary shaft, a pair of outside disks, an inside disk, a plurality of support members, a plurality of support plates, a plurality of power rollers, a plurality of actuators, and a pair of support posts is stored into the casing through the opening, and the actuator body is connected and fixed to the casing.

8. A toroidal-type continuously variable transmission as set forth in claim 1, being a half-toroidal-type continuously variable transmission in which lines connecting the center axes of the pivot shafts serving as the inclination centers of the power rollers to the rolling contact positions between the peripheral surfaces of the power rollers and the axial-direction side surfaces of the outside and inside disks are free from presenting on the same straight line.

9. A toroidal-type continuously variable transmission asset forth in claim 2, being a half-toroidal-type continuously variable transmission in which lines connecting the center axes of the pivot shafts serving as the inclination centers of the power rollers to the rolling contact positions between the peripheral surfaces of the power rollers and the axial-direction side surfaces of the outside and inside disks are free from presenting on the same straight line.

10. A toroidal-type continuously variable transmission as set forth in claim 3, being a half-toroidal-type continuously variable transmission in which lines connecting the center axes of the pivot shafts serving as the inclination centers of the power rollers to the rolling contact positions between the peripheral surfaces of the power rollers and the axial-direction side surfaces of the outside and inside disks are free from presenting on the same straight line.

11. A toroidal-type continuously variable transmission as set forth in claim 1, wherein the support members and the power rollers are interposed between the axial-direction one-side surfaces of the pair of outside disks and the axial-direction two-side side surfaces of the inside disk by two at two positions on the opposite side in the diameter direction of the respective disks.

12. A toroidal-type continuously variable transmission as set forth in claim 2, wherein the support members and the power rollers are interposed between the axial-direction one-side surfaces of the pair of outside disks and the axial-direction two-side side surfaces of the inside disk by two at two positions on the opposite side in the diameter direction of the respective disks.

13. A toroidal-type continuously variable transmission as set forth in claim 3, wherein the support members and the power rollers are interposed between the axial-direction one-side surfaces of the pair of outside disks and the axial-direction two-side side surfaces of the inside disk by two at two positions on the opposite side in the diameter direction of the respective disks.

14. A continuously variable transmission apparatus, in combination a toroidal-type continuously variable transmission unit with a planetary-gear-type transmission unit, comprising:

an input shaft connected to the rotary shaft of the toroidal-type continuously variable transmission unit; and an output shaft connected to the composing parts of the planetary-gear-type transmission unit, wherein the toroidal-type continuously variable transmission unit, comprises: a casing; a rotary shaft rotatably supported in the interior of the casing; a pair of outside disks each including an axial-direction one-side surface having an arc-shaped section, the outside disks being respectively supported on the two end portions of the rotary shaft so as to be rotatable in synchronization with the rotary shaft in a state that axial-direction one-side surfaces opposed to each other;

an inside disk formed as an integral body or including a pair of elements connected together and including axial-direction two side surfaces each having an arc-shaped section, the inside disk being supported so as to be rotatable with respect to the rotary shaft in a state that the axial-direction two side surfaces respectively opposed to the axial-direction one-side surfaces of the respective outside disks;

support members interposed by two or more between the axial-direction two side surfaces of the inside disk and the axial-direction one-side surfaces of the respective outside disks with respect to the axial direction of the toroidal-type continuously variable transmission so as to be swung and shifted about associated pivot shafts thereof disposed at positions twisted with respect to the rotary shaft;

a plurality of support plates for supporting the pivot shafts disposed on the two end portions of the support members;

a plurality of power rollers each including a peripheral surface formed as a spherically projecting surface and respectively rotatably supported on the associated support plates, the peripheral surfaces of the power rollers being contacted with the axial-direction two side surfaces of the inside disk and the axial-direction one-side surfaces of the two outside disks;

an actuator of an oil pressure type for shifting the support members in the axial direction of the associated pivot shafts; an actuator body storing the main body portion of the actuator therein;

a pair of support posts each including a support ring portion, the support ring portions respectively existing in the middle portion between the axial-direction two side surfaces of the inside disk and the axial-direction one-side surfaces of the two outside disks, wherein the respective one-side end portions of the two support posts are connected and fixed to the actuator body in a state that the rotary shaft is inserted through the support ring portions of the two support posts, the axial-direction two end portions of the inside disk are rotatably supported on the support ring portions of the two support posts, and the support plates are supported on the neighboring portions of the two end portions of the two support posts, the planetary-gear-type transmission unit is structured such that the power is transmitted thereto from the rotary shaft and the inside disk of the toroidal-type continuously variable transmission unit, the planetary-gear-type transmission unit includes a switching device for switching the transmission passage of the power into two systems.

15. A toroidal-type continuously variable transmission as set forth in claim 14, further including:

a hollow rotary shaft disposed on the periphery of the middle portion of the rotary shaft, and wherein the planetary-gear-type transmission unit further comprises: a carrier connection and fixed to the pair of outside disks including the toroidal-type continuously variable transmission unit concentrically with the two outside disks and rotating with both of the outside disks;

a plurality of first planetary gears rotatably supported on one of the axial-direction two side surfaces of the carrier opposed to one of the outside disks;

a first sun gear connected to the inside disk by the hollow rotary shaft not only disposed concentrically with the inside and outside disk so as to be rotatable but also meshingly engaged with the first planetary gears;

a plurality of second planetary gears rotatably supported on the other side surface of the carrier;

a second sun gear not only disposed concentrically with the inside and outside disk so as to be rotatable but also meshingly engaged with the first planetary gears, a ring not only disposed concentrically with the input side and output side disks so as to be rotatable but also meshingly engaged with the first planetary gears, wherein the switching device selects a mode for transmitting the power taken out from the inside disk through the ring gear to the output shaft or a mode for transmitting the power taken out from the inside disk through the second sun gear to the output shaft.

* * * * *